(12) United States Patent
Thaler (10) Patent No.: US 9,166,917 B2
(45) Date of Patent: Oct. 20, 2015

(54) LINK LAYER PREEMPTION (75) Inventor: Patricia A. Thaler, Carmichael, CA (US)

(73) Assignee: BROADCOM CORPORATION, Irvine, CA (US)

( * ) Notice: Subject to any disclaimer, the term of this patent is extended or adjusted under 35 U.S.C. 154(b) by 460 days.

(21) Appl. No.: 13/539,425

(22) Filed: Jun. 30, 2012

(65) Prior Publication Data

US 2013/0016724 A1   Jan. 17, 2013

Related U.S. Application Data (60) Provisional application No. 61/508,683, filed on Jul. 17, 2011.

(51) Int. Cl.
*H04L 12/28* (2006.01)
*H04L 12/851* (2013.01)

(52) U.S. Cl.
CPC .................................... *H04L 47/245* (2013.01)

(58) Field of Classification Search
CPC ................. H04L 29/06095; H04L 29/0653; H04L 29/06102; H04L 61/60
USPC .............................. 370/393, 394, 392, 395.42
See application file for complete search history.

(56) References Cited

U.S. PATENT DOCUMENTS

| | | | | |
|---|---|---|---|---|
| 5,524,116 A * | 6/1996 | Kalmanek et al. | ............ | 714/799 |
| 7,464,180 B1 * | 12/2008 | Jacobs et al. | .................. | 709/240 |
| 2002/0041595 A1 * | 4/2002 | Delvaux | ........................ | 370/392 |
| 2002/0147826 A1 * | 10/2002 | Sultan | ........................... | 709/230 |
| 2004/0141503 A1 * | 7/2004 | Sinha | ............................. | 370/389 |
| 2004/0184481 A1 * | 9/2004 | Lee | ................................. | 370/469 |
| 2004/0258092 A1 * | 12/2004 | Sugaya | ........................ | 370/474 |
| 2006/0120400 A1 * | 6/2006 | Fukuoka et al. | .............. | 370/447 |
| 2008/0056192 A1 * | 3/2008 | Strong et al. | .................. | 370/331 |
| 2012/0002680 A1 * | 1/2012 | Naouri et al. | ................. | 370/428 |
| 2012/0207183 A1 * | 8/2012 | Bobrek et al. | ................. | 370/511 |

* cited by examiner

*Primary Examiner* — Hassan Phillips
*Assistant Examiner* — Siren Wei
(74) *Attorney, Agent, or Firm* — Oblon, McClelland, Maier & Neustadt, L.L.P.

(57) ABSTRACT

Disclosed are various embodiments for frame preemption and fragmentation at the media access control (MAC) sublayer of the link layer or the MAC merge sublayer of the link layer. Traffic classes may be organized into preemptive traffic classes and non-preemptive traffic classes. Preemptable frames may be fragmented when a preemptive frame is to be transmitted. The fragmentation may be indicated through modification of the value of cyclic redundancy check (CRC) field in a predetermined way, through addition of a fragmentation trailer, and/or through other approaches.

18 Claims, 9 Drawing Sheets

LINK LAYER PREEMPTION

CROSS-REFERENCE TO RELATED APPLICATIONS

This application claims priority to, and the benefit of, U.S. Provisional Patent Application entitled "MEDIA ACCESS CONTROL LAYER PREEMPTION," having Ser. No. 61/508,683, filed on Jul. 17, 2011, which is incorporated by reference in its entirety.

BACKGROUND

Standards such as Institute of Electrical and Electronics Engineers (IEEE) 802.1 and IEEE 802.3 provide a transmitter at the media access control (MAC) sublayer with the ability to select high priority frames to be sent over the physical layer (PHY) of the network, while holding back other lower priority frames. However, if a lower priority frame is currently being transmitted, the high priority frame is delayed until the lower priority frame is transmitted.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to techniques for providing preemption and fragmentation of data frames at the link layer, such as at the media access control (MAC) sublayer of the link layer or at the MAC merge sublayer of the link layer. Although MAC sublayer standards may provide an ability to prioritize frames, if a lower priority frame is currently being transmitted, the high-priority frame is delayed until the low-priority frame has been transmitted. With 1500 byte frame sizes in Ethernet, the delay incurred by a high-priority frame may be unacceptable. For example, with 100 Megabit Ethernet, a low-priority frame may take over 100 microseconds to be transmitted, during which time the high priority frame is delayed.

Additionally, larger, "jumbo" frames of 9 Kilobytes or greater are sometimes used for reducing frame processing overhead, even though such frames are non-standard. Transmission delays are even more unacceptable when jumbo frames are in use. Reducing such latencies is crucial for some automotive, industrial, and other applications. For example, in an automotive networking application, a 100 microsecond delay while a data frame for a video playback system is being transmitted may unduly interfere with a high priority data frame for an anti-lock brake system.

Various embodiments of the present disclosure enable preemption of frames at the MAC sublayer so that a high priority frame may interrupt the transmission of a lower priority frame. One benefit to adding preemption at the MAC sublayer is to reduce modifications to existing standards and devices, such as IEEE 802.1 or IEEE 802.3. Changes to the PHY layer are particularly undesirable in the existing IEEE 802.1 and 802.3 models. Accordingly, in various embodiments, fragmentation and preemption are supported by changes to the transmission selection and MAC control.

Figure 1:
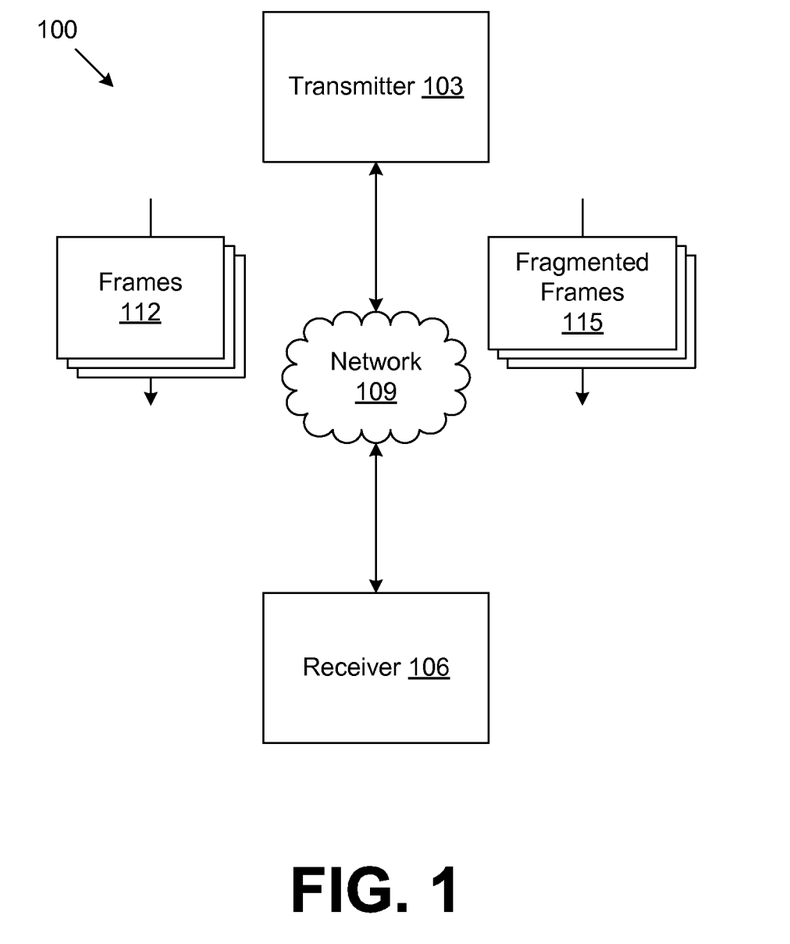
FIG. 1 is a drawing of an exemplary networked environment according to various embodiments of the present disclosure.

FIG. 1 is a drawing of an exemplary networked environment 100 according to various embodiments of the present disclosure. The networked environment 100 includes a transmitter 103 and a receiver 106 coupled by way of a network 109. The transmitter 103 may correspond to a device having a network interface controller (NIC) capable of sending frames 112 which are not fragmented and fragmented frames 115 to the receiver 106 over the network 109. The network 109 may correspond to an Ethernet network including various hubs, switches, bridges, and/or other layer-1 or layer-2 devices. The frames 112 and fragmented frames 115 may, for example, correspond to Ethernet frames. In some scenarios, the frames 112 and fragmented frames 115 may be encapsulated for transmission via other types of networks 109.

Figure 2A:
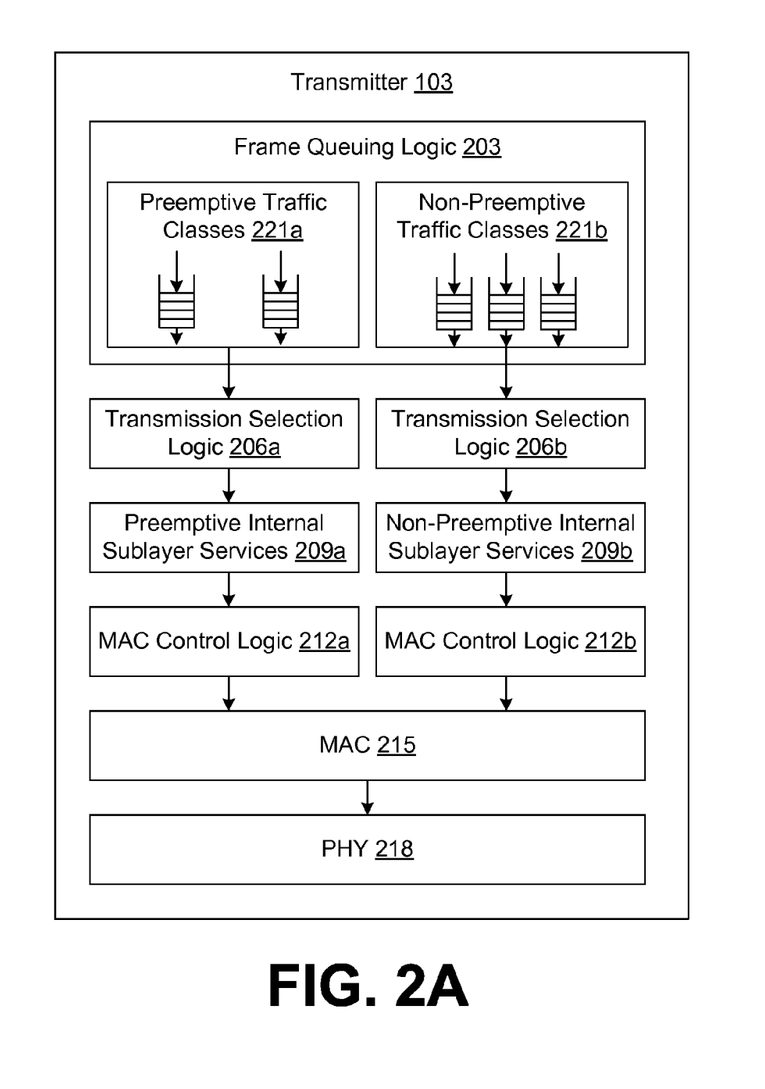
FIGS. 2A and 2B depict exemplary transmitters in the networked environment of FIG. 1 embodying a transmission model for preemption at the MAC sublayer or the MAC merge sublayer according to various embodiments of the present disclosure.

FIG. 2A depicts an exemplary transmitter 103 in the networked environment 100 (FIG. 1) embodying a transmission model for preemption at the MAC sublayer according to various embodiments of the present disclosure. The transmitter 103 includes, for example, frame queuing logic 203, transmission selection logic 206a and 206b, preemptive internal sublayer services (ISS) 209a, non-preemptive ISS 209b, MAC control logic 212a and 212b, a MAC 215 with preemption support, and a PHY 218 that may be unaware of preemption. The transmitter 103 may include other logic or components which are omitted to simplify discussion. Such components may include a reception port, reception port state, transmission port state, active topology enforcement logic, ingress logic, frame filtering logic, egress logic, flow metering logic, and so on.

It may be the case that preemption is determined based on traffic class (TC) 221. IEEE 802.1 defines eight distinct priorities, which may be grouped into traffic classes 221. One or more high priority traffic classes 221 may be configured to be preemptive. As shown in FIG. 2A, the frame queuing logic 203 is configured for processing preemptive traffic classes 221a and non-preemptive traffic classes 221b. Frames may be classified to a priority belonging to a preemptive traffic class 221a at their source. Alternatively, the frame queuing logic 203 may look at some data in the frame 112 (e.g., the Ethertype field or other data) and a classification rule is applied.

In one embodiment, a strict priority approach to preemption may be applied such that the highest priority frame 112 is always sent. In another embodiment, a credit-based shaper approach is utilized. With a credit-based shaper approach, flow metering is employed to ensure that frames 112 are sent only up to a certain rate. In other words, reservations may be made for bandwidth. In another embodiment, a time-based shaper approach may be employed. With a time-based shaper approach, the flow metering services the frames 112 in a flow at fixed time intervals or slots. In yet another embodiment, enhanced transmission selection is employed for multiple traffic classes 221. For example, a traffic class 221 may not be classified as high priority, but 50% of the bandwidth on a link may be reserved for that traffic class. Round-robin servicing may be employed to prevent starvation.

As shown in FIG. 2A, preemptive and non-preemptive traffic classes 221 have separate paths to the MAC sublayer 215, which may include their own transmission selection logic 206 and MAC control logic 212. The preemptive and non-preemptive internal sublayer services (ISS) 209 may be the same as the current ISS, with a change in roles but not behavior. Other than a path split at the traffic class 221 queues, it may be the case that only the MAC 215 has special behavior for preemption. Each of the split transmission selection logic 206 and MAC control logic 212 may operate normally. If the transmitter 103 includes a MAC merge sublayer as will be discussed with reference to FIG. 2B, the MAC 215 may also operate normally. If the pause function or priority-based flow control is enabled, it may operate in the MAC control logic 212a of the preemptive path.

The MAC control logic 212 sublayer may be present on one or on both paths. Transmission selection logic 206a on the preemptive path might have more limited behavior. For example, transmission selection logic 206a on the preemptive path may support strict priority only or one traffic class 221 only. In the receiver 106, reception may be handled entirely on one ISS from the MAC in some embodiments. In other embodiments, receive traffic may also be split to the preemptive ISS and non-preemptive ISS.

Various approaches to fragmentation for preemption will next be discussed. One approach adds a fragmentation header to the frame 112. However, in such an approach, preemptable frames 112 are always fragmented, for example, to a predetermined fragment size. The preemptable frames 112 are always fragmented because the decision to preempt transmission of the frame 112 may occur after the fragmentation header is already sent. This approach has the drawback of using extra bandwidth on the network 109 even when a frame 112 does not need to be preempted.

Another approach to fragmentation is where a transmitter normally sends the full frame 112 and fragments when a preempting frame 112 needs to be sent. Such an approach to fragmentation on the fly marks the fragmented frame 115 in some way after the frame header has already been sent. In various embodiments, all frames 112 may carry a fragmentation trailer with a bit that indicates whether the frame 112 is complete. In one embodiment, all frames 112 having priorities that are capable of being preempted carry the fragmentation trailer. In other embodiments, the cyclic redundancy check (CRC) field of the IEEE 802.3 frame 112 may be modified to mark whether the frame 112 is incomplete or fragmented.

Figure 2B:
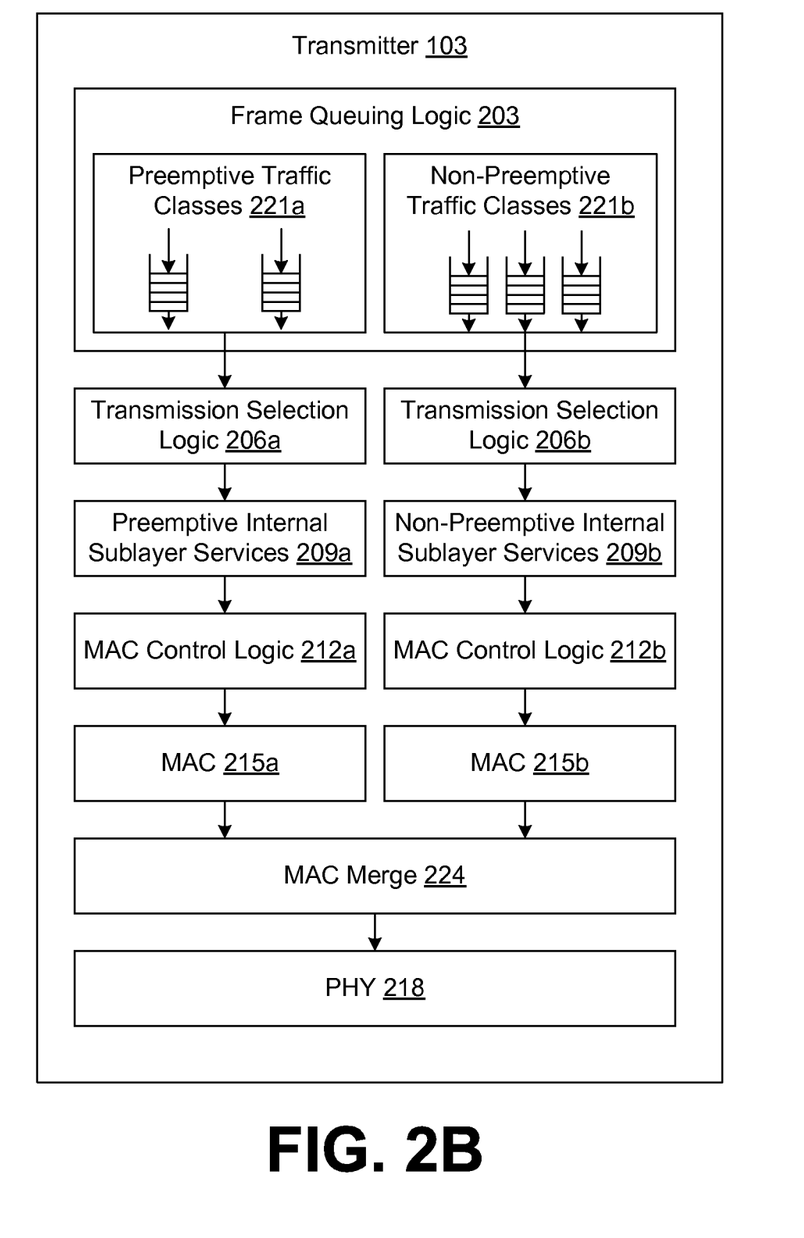

FIG. 2B depicts another exemplary transmitter 103 in the networked environment 100 (FIG. 1) embodying a transmission model for preemption at the MAC merge sublayer according to various embodiments of the present disclosure. In contrast to FIG. 2A, the transmitter 103 in FIG. 2B has separated the MAC 215a and 215b for the preemptive and non-preemptive paths and has added a MAC merge 224 sublayer. Functionally, the result of the transmitter 103 in FIG. 2B (i.e., the preemption and fragmentation) may be the same as that of the transmitter 103 in FIG. 2B. However, in FIG. 2B, the MACs 215a and 215b perform the existing MAC tasks, while the MAC merge 224 sublayer handles the preemption, fragmentation, and reassembly of frames 112 (FIG. 1).

Figure 3:
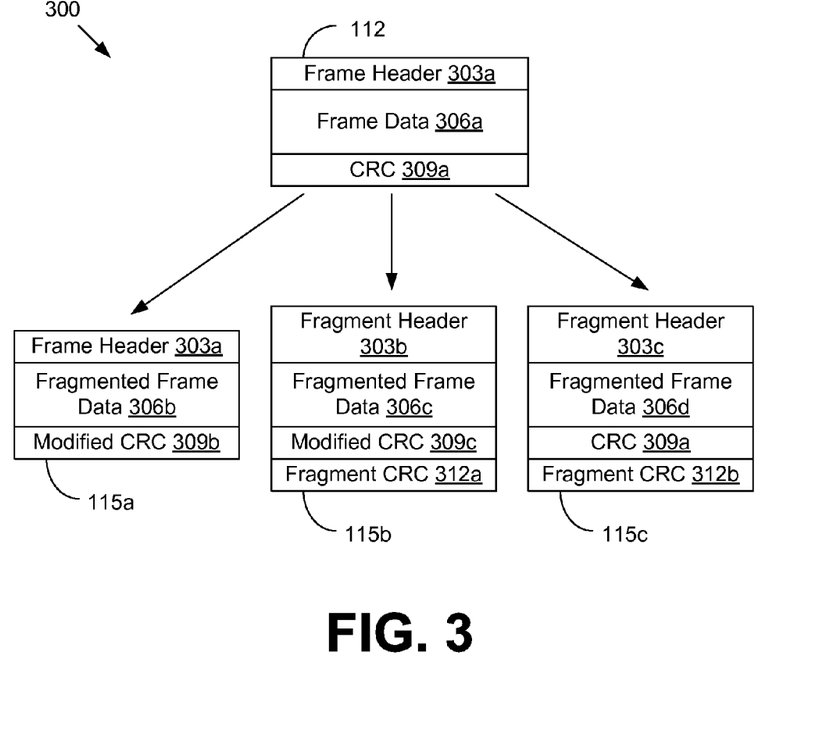
FIG. 3 illustrates an exemplary approach to fragmentation that involves modifying the CRC field of the frame in the exemplary transmitter of FIG. 2A in the networked environment of FIG. 1 according to various embodiments of the present disclosure.

FIG. 3 illustrates an exemplary approach 300 to fragmentation that involves modifying the CRC field of the frame 112 in the transmitter 103 (FIG. 2A) in the networked environment 100 (FIG. 1) according to various embodiments of the present disclosure. The exemplary approach 300 shows a frame 112 including a frame header 303a, frame data 306a, and a CRC 309a being split into three fragmented frames 115a, 115b, and 115c. The first fragmented frame 115a includes, for example, the same frame header 303a, fragmented frame data 306b generated from the frame data 306a, and a modified CRC 309b. The second fragmented frame 115b includes, for example, a fragment header 303b, more fragmented frame data 306c generated from the frame data 306a, a modified CRC 309c, and a fragment CRC 312a. The third fragmented frame 115c includes, for example, a fragment header 303c, more fragmented frame data 306d generated from the frame data 306a, the same CRC 309a as in the frame 112, and a fragment CRC 312b. Although three fragmented frames 115 are shown for purposes of discussion, it is understood that a frame 112 may be fragmented into any number of fragmented frames 115 as desired.

In the exemplary approach 300, the CRC fields of all fragmented frames 115 before the last fragmented frame 115 of the frame 112 (i.e., the modified CRCs 309b and 309c) store the inverted result of the CRC. The inverted CRC indicates that the fragmented frame 115 is fragmented. Because the CRC calculation complements the result of the calculation before appending it to the fragmented frame 115, the inverted CRC is the direct result of the calculation. In another example, only a portion of the CRC is inverted. In still other examples, the CRC fields may be modified in some other predetermined way, e.g., applying an XOR mask to the CRC, adding one to the result, subtracting one from the result, and so on. An error causing an inverted CRC (or a CRC modified in one other predetermined way) is no more likely than an undetected error, i.e., an error resulting in a correct CRC. When a receiver 106 processes a modified CRC, it may then assume that the fragmented frame 115 is a fragment of a frame 112 with additional fragments to come.

To ensure data integrity of a fragmented frame, it is desirable that there is a CRC covering the contents of the frame as it would have been sent in the absence of fragmentation. In some embodiments, the fragments after the first fragment may also include a fragment CRC field 312. The fragment CRC 312 may correspond to a CRC or other error detecting code that covers, for example, the entire fragment or another portion of the sequence of fragmented frames 115. The modified CRC 309 may cover the normal frame MAC header and the previously sent MAC client data. The fragment CRC 312 may cover the contents of the fragment including the fragment header 303. Alternatively, the fragment header 303 may include a fragment header CRC in which case a fragment CRC is not necessary. The CRC field in the last fragmented frame 115c may cover the normal frame header 303a and all the MAC client data of the fragmented frame 115. In that case, the CRC field in the last fragmented frame 115 may, for example, be the same as the CRC 309a that would have been sent in the absence of fragmentation.

In some embodiments according to the exemplary approach 300, the fragment header 303 may include frame and fragment number fields to provide for protection against dropped fragments beyond the CRC. It may be that the fragment headers 303b and 303c include frame and fragment number fields, but the frame header 303a in the first fragmented frame 115a does not. In such a case, the first fragmented frame 115a can be assumed to have a fragment number of one and a frame number incremented by one relative to the last frame 112 that was fragmented.

Figure 4:
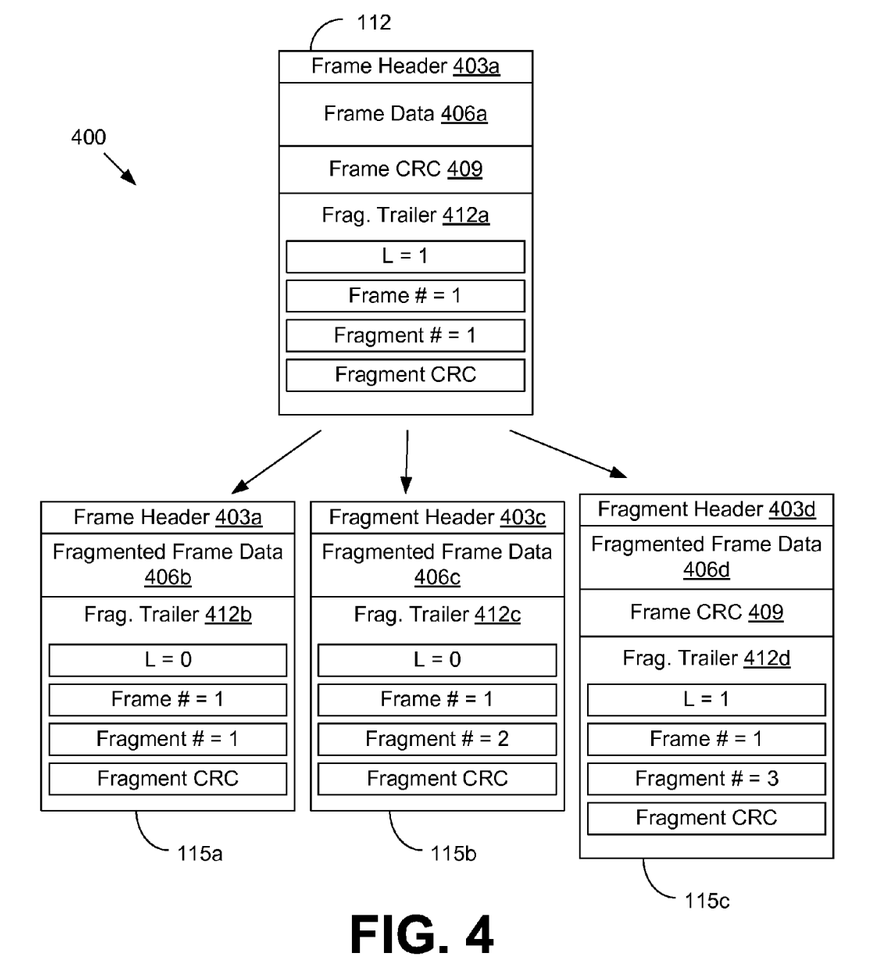
FIG. 4 illustrates an exemplary approach to fragmentation that involves adding a fragmentation trailer to frames in the exemplary transmitter of FIG. 2A in the networked environment of FIG. 1 according to various embodiments of the present disclosure.

FIG. 4 illustrates an exemplary approach 400 to fragmentation that involves adding a fragmentation trailer to frames 112 in the transmitter 103 (FIG. 2A) in the networked environment 100 (FIG. 1) according to various embodiments of the present disclosure. The exemplary approach 400 shows a frame 112 including a frame header 403a, frame data 406a, a frame CRC 409, and a fragmentation trailer 412a being split into three fragmented frames 115a, 115b, and 115c. The first fragmented frame 115a includes, for example, a frame header 403a, fragmented frame data 406b, and a fragmentation trailer 412b. The second fragmented frame 115b includes, for example, a fragment header 403c, fragmented frame data 406c, and a fragmentation trailer 412c. The third fragmented frame 115c includes, for example, a fragment header 403d, fragmented frame data 406d, a frame CRC 409, and a fragmentation trailer 412d. Although three fragmented frames 115 are shown for purposes of discussion, it is understood that a frame 112 may be fragmented into any number of fragmented frames 115 as desired.

The purpose of the fragment headers 403 is to allow the receiver 106 (FIG. 1) to realize that the incoming fragmented frame 115 is a continuation of a previous fragmented frame 115. Without a fragment header 403, the receiver 106 would not tell a fragment continuation apart from a preempting frame 112 since fragmented frame data 406 may start with any data. The first fragmented frame 115a starts with a frame header 403a, so it does not have a fragment header 403. Even if a fragment header 403 were included in the first fragmented frame 115a, the first fragmented frame 115a would still carry a frame header 403a.

The fragmentation trailer approach provides for protection against dropped fragments beyond the CRC by carrying frame and fragment numbers. The fragmentation trailers 412 may be appended to each frame 112 that may be preempted by a higher priority frame. In one embodiment, the fragmentation trailer is 32 bits, although other sizes may be used. The fragmentation trailers 412 may include a last fragment indicator (L), a frame number, a fragment number, and a fragment CRC. L may be one bit that, when set, indicates that the frame 112 or 115 is unfragmented or is the last fragment of a frame 112 that has been fragmented. In the non-limiting example of FIG. 4, frame 112 and fragmented frame 115c both have L set to indicate a last fragment.

Frame number may be a field that is incremented for each preemptable frame transmitted. As a non-limiting example, the frame number field may store 7-bits that step from 1 to 127 and back to 1. In such an example, 0 may be used for non-preemptable frames from the preemptive ISS 209a (FIG. 2A). As another non-limiting example, 0 may be used to indicate if a frame is not fragmented, regardless of whether it the frame is preemptable, and the value may be incremented only for fragmented frames. Incrementing for each preemptable frame 112 or 115 has the advantage of the receiver 106 seeing an increment in the frame number when the receiver 106 had processed a fragmented frame 115. Thus, the receiver 106 is able to determine that the last fragment has been lost and that the previous fragment should be abandoned.

As a non-limiting example, the fragment number field may be an 8-bit field that is 1 in the first fragment and is incremented for each subsequent fragment. Assuming a minimum 128-byte fragment size, for example, this allows for a frame size up to 32 kilobytes. If smaller fragments are desired (e.g., down to a 16 byte payload) or if even larger jumbo frames are desired, the frame number field could be made shorter (e.g., to 3 or 4 bits or some other number) and the fragment number field size could be increased. In the non-limiting example of FIG. 4, frame 112 has the fragment number set to 1, fragmented frame 115a has the fragment number set to 1, fragmented frame 115b has the fragment number set to 2, and the fragmented frame 115c has the fragment number set to 3.

The frame number field facilitates additional detection for a corner case where the last fragment of one frame and the first fragment of another frame were lost. Thus, improper creation of a frame from two partial frames may be avoided in that case. In the non-limiting example of FIG. 4, frame 112 has the frame number set to 1, fragmented frame 115a has the frame number set to 1, fragmented frame 115b has the frame number set to 1, and the fragmented frame 115c has the frame number also set to 1.

The fragmentation trailer 412 may also include a fragment CRC field. As a non-limiting example, the fragment CRC field may correspond to a 16-bit CRC covering the whole fragment. This may provide error detection for the fragment header 403 that may be present in intermediate and last fragments, the fragmentation trailer 412 fields, as well as the frame data 406. The frame CRC 409 appears in the last fragment before the fragmentation trailer 412. As usual, it may cover the normal frame as defined, for example, in 802.3 clause 3. The frame CRC 409 may be unchanged by fragmentation and can be preserved on transit through a bridge as normal.

In another approach using fragmentation trailers, only preemptable frames 112 carry the fragmentation trailer 412 In such embodiments, the receiving MAC is configured to examine the frame 112 priority to determine whether the frame 112 has a fragmentation trailer 412 so that the frame 112 may be properly processed. However, such an approach would result in a layer violation because priority is associated with sub-layers above the MAC sublayer 215 (FIG. 2A). There are several forms of tags defined in IEEE 802.1Q to carry priority and more could be developed. Therefore, a MAC 215 would be modified to find the priority field.

Otherwise, if only preemptable frames 112 carry the fragmentation trailer 412, a fragmentation header may be inserted into all preemptable frames 112. This would avoid a layer violation. However, the bulk of the traffic on a heavily utilized link may be preemptable frames 112. Consequently, adding bytes to preemptable frames 112 to save sending a fragmentation trailer 412 on preempting frames 112 may actually increase bandwidth utilization in some circumstances. Also, it is noted that a fragmentation header that marks non-preemptable frames 112 could assist the receiver 106 in determining to allow cut-through for those frames 112.

In one embodiment, a fragment header may comprise a destination address field, a source address field, a fragmentation Ethertype field, and/or other data. As an example, the destination address field may include one of the predetermined multicast addresses that do not pass through bridges. The source address field may include the source address of the fragmenting MAC. Alternatively, the source address field may define additional data about the fragment. For example, the source address field may include the frame number or fragment number so the receiving MAC does not have to wait until receiving the trailer to process it. The fragment header may include two or more reserved bytes to make the fragment header into 16 bytes or some other size.

A transmitter 103 embodying a MAC sublayer 215 configured for preemption may provide several additional transmit functions. For example, the transmitter 103 may include an additional ISS 209, an additional CRC generator to generate fragment CRCs, logic that maintains state for frame count and fragment count, logic that inserts fragment headers on fragments, logic that inserts fragmentation trailers, a counter for a minimum fragment size, logic that facilitates transmission multiplexing between the two ISS interfaces, and/or other logic.

A receiver 106 embodying a MAC sublayer configured for preemption may provide several additional receive functions. For example, the receiver 106 may have an additional ISS, an additional CRC checker to check fragment CRCs, logic that maintains state for frame count and fragment count, logic that checks and removes fragment headers on fragments, logic that checks and removes fragmentation trailers frames and fragments, logic that stores incomplete preempted frames (the storage need not be in the MAC), logic that reassembles fragmented frames, and/or other logic.

When preemption is allowed, bridge cut-through may be disabled for traffic in non-preemptive traffic classes 221b. If cut-through is allowed, the transmitter 103 might start transmitting the frame 112 out another port and run out of data during the preemption. Cut-through might be allowed on preemptive frames 112 if the receiver 106 is able to determine which frames 112 are preemptive frames 112.

In some embodiments, a minimum fragment size may be configured to prevent preemption from occurring before the minimum fragment size is sent. If no minimum fragment size is configured, there might be cases where a frame 112 is preempted by a stream of preempting frames 112 and only a few fragmented bytes are sent in between, which may be inefficient. The frame 112 may include a full inter-frame gap, a full or partial preamble, source address field, destination address field, Ethertype field, fragment CRC, and/or other data, resulting in an overhead of 48 bytes or more. Thus, a minimum fragment size of 64 bytes, 128 bytes, 256 bytes, or some other value may be configured.

Figure 5:
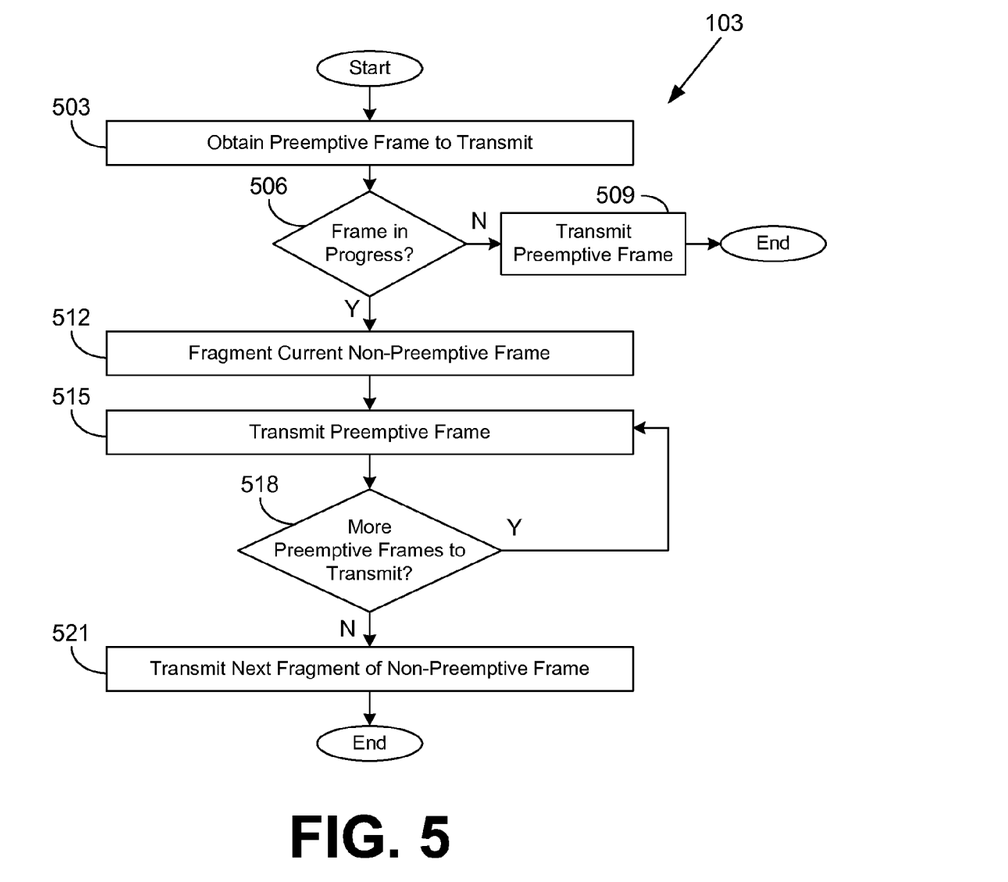
FIG. 5 is a flowchart that provides one example of the operation of a portion of the exemplary transmitter of FIG. 2A in the networked environment of FIG. 1 according to various embodiments.

FIG. 5 is a flowchart that provides one example of the operation of a portion of the transmitter 103 (FIG. 2A) in the networked environment 100 (FIG. 1) according to various embodiments. Specifically, FIG. 5 describes one example of the logic that facilitates transmission multiplexing. It is understood that the flowchart of FIG. 5 provides merely an example of the many different types of functional arrangements that may be employed to implement the operation of the portion of the transmitter 103 as described herein. As an alternative, the flowchart of FIG. 5 may be viewed as depicting an example of steps of a method implemented in the transmitter 103 according to one or more embodiments.

Beginning with reference numeral 503, the transmitter 103 obtains a frame 112 (FIG. 1) to transmit from the preemptive ISS 209a (FIG. 2A). In reference numeral 506, the transmitter determines whether a frame 112 is in progress. If no frame 112 is in progress, the preemptive frame 112 is transmitted in reference numeral 509. Thereafter, the portion of the transmitter 103 ends.

If the preemptive ISS 209a has a frame 112 to transmit and if a non-preemptive frame 112 is in progress and has reached the minimum fragment size but has not completed transmission, the transmitter 103 moves from reference numeral 506 to reference numeral 512 and fragments the current non-preemptive frame 112. For example, a fragmentation trailer 412 (FIG. 4) may be appended to indicate that it is not the last fragment. The preemptive frame 112 is transmitted after the inter-frame gap (IFG) in reference numeral 515.

In reference numeral 518, the transmitter 103 determines whether the preemptive ISS 209a has more frames 112 to transmit. If more preemptive frames 112 remain to transmit, the transmitter 103 returns to reference numeral 515 and transmits another preemptive frame 112. Otherwise, if the preemptive ISS 209a has no frames 112 to transmit, the fragment count is incremented and transmission of the next fragmented frame 115 (FIG. 1) of the non-preemptive frame 112 in progress is initiated in reference numeral 521. Thereafter, the portion of the transmitter 103 ends.

Figure 6:
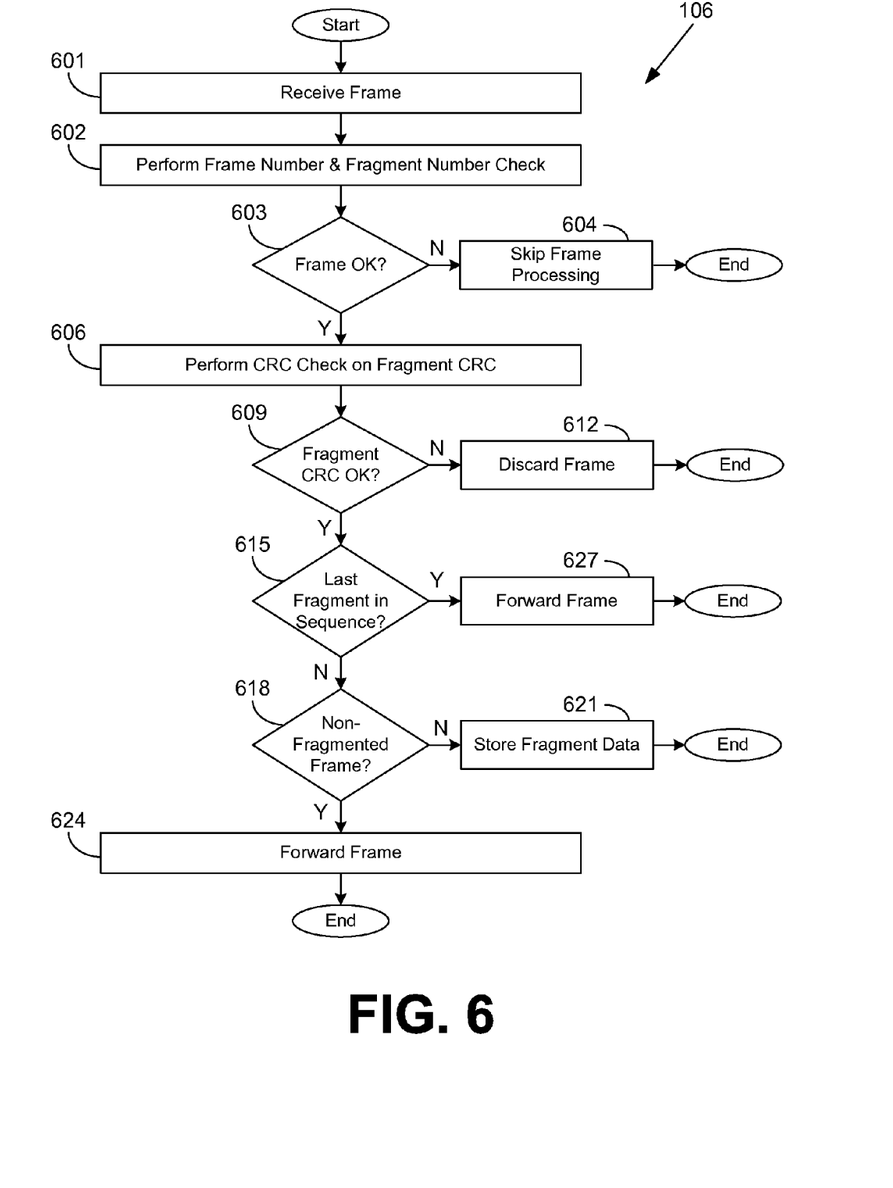
FIG. 6 is a flowchart that provides one example of the operation of a portion of the receiver in the networked environment of FIG. 1 according to various embodiments.

FIG. 6 is a flowchart that provides one example of the operation of a portion of the receiver 106 in the networked environment 100 (FIG. 1) according to various embodiments. Specifically, FIG. 6 describes one example of the logic that reassembles fragmented frames 115 (FIG. 1). It is understood that the flowchart of FIG. 6 provides merely an example of the many different types of functional arrangements that may be employed to implement the operation of the portion of the receiver 106 as described herein. As an alternative, the flowchart of FIG. 6 may be viewed as depicting an example of steps of a method implemented in the receiver 106 according to one or more embodiments.

Beginning with reference numeral 601, a frame 112 (FIG. 1) is received. In reference numeral 602, a frame number and fragment number check is performed on the frame 112 by the receiver 106. This action verifies, for example, whether the current frame 112 is the next fragmented frame 115 in a sequence and whether the current fragmented frame 115 belongs to the frame 112 that is currently being reassembled. In reference numeral 603, the receiver 106 determines whether the frame 112 is ready for processing according to the checks performed in reference numeral 602. If the frame 112 is not ready for processing, the receiver 106 ends processing of the frame 112 in reference numeral 604. The frame 112 may be discarded or stored in a buffer for future processing as appropriate. Thereafter, the portion of the receiver 106 ends.

Otherwise, in reference numeral 606, a CRC check is performed on the fragment CRC of the frame 112. In reference numeral 609, the receiver 106 determines whether the fragment CRC is okay or bad. If a fragment CRC is bad, the frame 112 is discarded in reference numeral 612. Thereafter, the portion of the receiver 106 ends. If the fragment CRC is OK, the receiver 106 continues from reference numeral 609 to reference numeral 615.

In reference numeral 615, the receiver 106 determines whether the frame 112 is the last fragmented frame 115 in a sequence. If the frame fragmentation trailer 412 (FIG. 4) indicates that the frame 112 is not the last fragment of a sequence, the following is performed. In reference numeral 618, the receiver 106 determines whether the frame 112 corresponds to a non-fragmented frame 115. If the frame 112 corresponds to a fragmented frame 115, in reference numeral 621, if the sequence is not complete, the fragmented frame 115, frame count, and fragment count are stored. In some embodiments, the frame number and fragment number checks may then be performed. If the frame number does not match or if the fragment number is not the current fragment number plus one, the stored fragment data is discarded. Otherwise, the data from the fragmented frame 115 is appended to the stored fragment data. Thereafter, the portion of the receiver 106 ends.

Any frames 112 that arrive with a non-fragment header are then processed in reference numeral 624. If the frame number is not zero, the last fragment is lost and the stored fragmented frame 115 is discarded. If the frame number is zero, the frame is a preemptive frame 112 and is forwarded. Thereafter, the portion of the receiver 106 ends.

If the fragmentation trailer 412 indicates that the frame 112 or fragmented frame 115 is the last fragment of a sequence in reference numeral 615, the frame 112 is complete and can be forwarded in reference numeral 627. If a fragmented frame 115 arrives when not expected, the fragmented frame 115 may be discarded. Thereafter, the portion of the receiver 106 ends.

Figure 7:
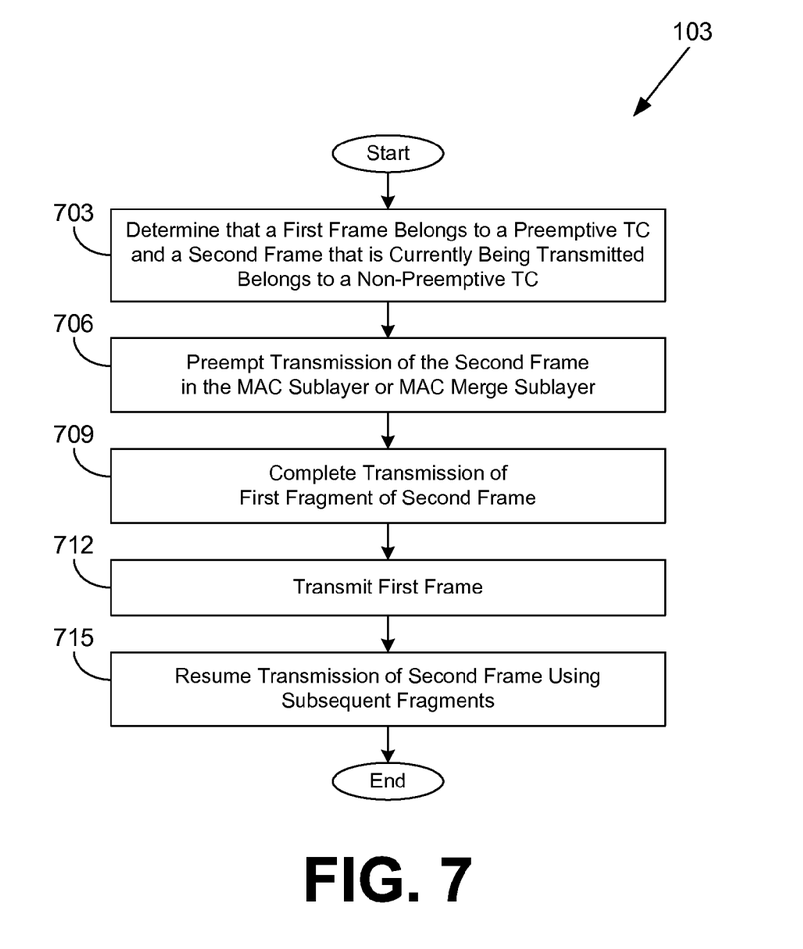
FIG. 7 is a flowchart that provides another example of the operation of a portion of the exemplary transmitter of FIG. 2A in the networked environment of FIG. 1 according to various embodiments.

FIG. 7 is a flowchart that provides another example of the operation of a portion of the transmitter 103 (FIG. 2A) in the networked environment 100 (FIG. 1) according to various embodiments. It is understood that the flowchart of FIG. 7 provides merely an example of the many different types of functional arrangements that may be employed to implement the operation of the portion of the transmitter 103 as described herein. As an alternative, the flowchart of FIG. 7 may be viewed as depicting an example of steps of a method implemented in the transmitter 103 according to one or more embodiments.

Beginning with reference numeral 703, the transmitter 103 determines that a first frame 112 (FIG. 1) belongs to a preemptive traffic class (TC) and that a second frame 112 that is currently being transmitted across a data communications link belongs to a non-preemptive (or preemptable) TC. In one embodiment, the transmitter 103 may have added a fragmentation header to the second frame 112 in response to determining that the second frame 112 is capable of being preempted. In reference numeral 706, the transmitter 103 preempts the transmission of the second frame in the MAC sublayer. The transmitter 103 may be configured to preempt when at least a predetermined amount of data of the second frame 112 has been transmitted.

In reference numeral 709, the transmitter 103 completes transmission of the first fragmented frame 115 (FIG. 1) of the second frame 112. In one embodiment, this may involve making a predetermined change to a CRC value of the first fragmented frame 115. This predetermined change may involve, for example, inverting at least a portion the CRC value or some other predetermined change. In one embodiment, each frame 112 that is transmitted includes a fragmentation trailer. Such a fragmentation trailer may include, for example, a field that indicates whether the frame 112 is the last fragment in a sequence of fragments, a frame number field that is incremented for each frame 112 transmitted that is capable of fragmentation, a fragment number field that is incremented for each fragmented frame 115 in a sequence of fragments, and/or other fields.

In reference numeral 712, the transmitter 103 transmits the first frame 112 over the data communications link after the transmission of the second frame 112 has been preempted. In reference numeral 715, the transmitter 103 resumes transmission of the second frame 112 over the data communications link using one or more subsequent fragmented frames 115 of the second frame 112. In one embodiment, a fragment CRC field may be appended to each of the subsequent fragmented frames 115. Thereafter, the portion of the transmitter 103 ends.

Figure 8:
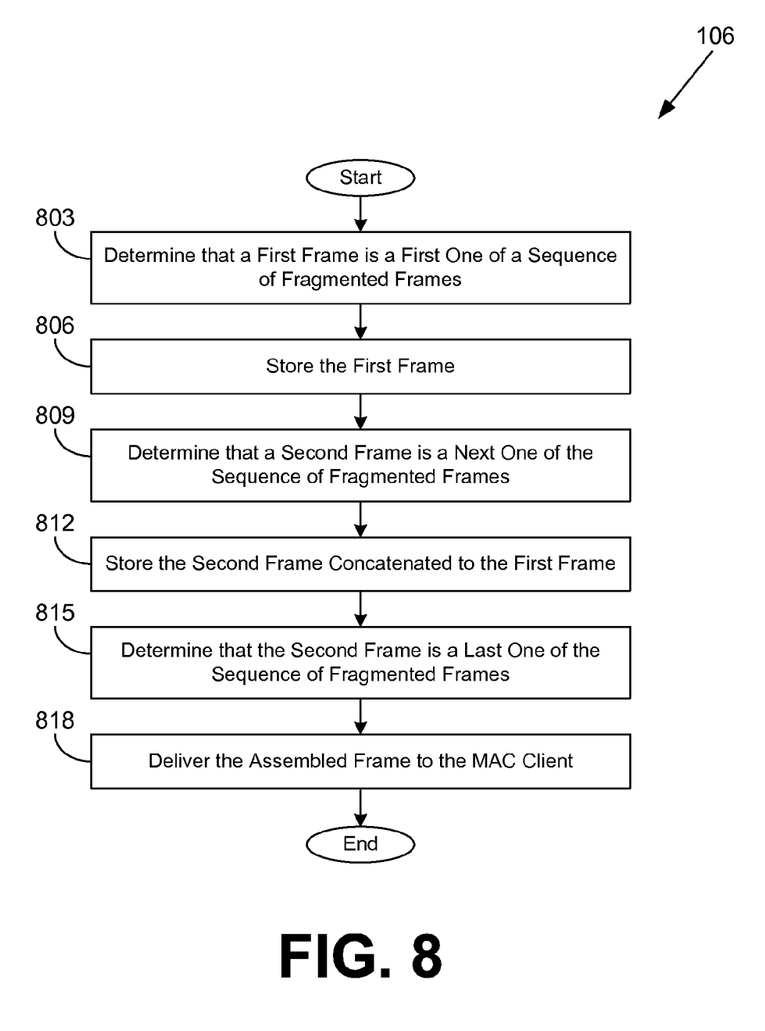
FIG. 8 is a flowchart that provides another example of the operation of a portion of the receiver in the networked environment of FIG. 1 according to various embodiments.

FIG. 8 is a flowchart that provides another example of the operation of a portion of the receiver 106 in the networked environment 100 (FIG. 1) according to various embodiments. It is understood that the flowchart of FIG. 8 provides merely an example of the many different types of functional arrangements that may be employed to implement the operation of the portion of the receiver 106 as described herein. As an alternative, the flowchart of FIG. 8 may be viewed as depicting an example of steps of a method implemented in the receiver 106 according to one or more embodiments.

Beginning with reference numeral 803, the receiver 106 determines that a first frame 112 (FIG. 1) corresponds to a first one of a sequence of fragmented frames 115 (FIG. 1). In this determination, the receiver 106 may determine that the first frame 112 has a CRC value that has been modified in a predetermined way. Alternatively, the first frame 112 may have a header that indicates that the first frame 112 is a fragmented frame 115. As a further alternative, the first frame 112 may have a fragment number in a fragmentation trailer 412 (FIG. 4) that indicates that the first frame 112 is an initial fragmented frame 115. In reference numeral 806, the receiver 106 stores the first frame 112.

In reference numeral 809, the receiver 106 determines that a second frame 112 is a next one of the sequence of fragmented frames 115. As part of the determination, the receiver 106 may determine that the second frame 112 includes a fragment number in a fragmentation trailer 412 that indicates a next fragment. Alternatively, the receiver 106 may determine that the second frame 112 includes a fragment number in a fragmentation trailer 412 that indicates a last fragment. The receiver 106 may also validate a value of a fragment CRC field.

In reference numeral 812, the receiver 106 stores the data from the second frame 112 concatenated to the data of the first frame 112 and any other previous fragments in the sequence. In reference numeral 815, the receiver 106 determines that the second frame 112 is the last one of the sequence of fragmented frames 115. In reference numeral 818, the receiver 106 delivers the assembled frame 112 to the MAC client. Thereafter, the portion of the receiver 106 ends.

Although the various systems described herein may be embodied in, dedicated hardware, as an alternative the same may also be embodied in software or code executed by general purpose hardware including general purpose processor and memory circuits, or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, field-programmable gate arrays, or other components, etc. Such technologies are generally well known by those skilled in the art and, consequently, are not described in detail herein.

The flowcharts of FIGS. 5-8 show the functionality and operation of an implementation of portions of the transmitter 103 and the receiver 106. If embodied in hardware, each block may represent a circuit or a number of interconnected circuits to implement the specified logical function(s). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc.

Although the flowcharts of FIGS. 5-8 show a specific order of execution, it is understood that the order of execution may differ from that which is depicted. For example, the order of execution of two or more blocks may be scrambled relative to the order shown. Also, two or more blocks shown in succession in FIGS. 5-8 may be executed concurrently or with partial concurrence. Further, in some embodiments, one or more of the blocks shown in FIGS. 5-8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A transmitter configured to send data frames across a data communications link, the transmitter comprising circuitry configured to:
   determine that a first data frame belongs to a preemptive traffic class and that a second data frame that is currently being transmitted over the data communications link belongs to a non-preemptive traffic class;
   preempt transmission of the second data frame in a media access control (MAC) sublayer or a MAC merge sublayer when the first data frame belongs to the preemptive traffic class and the second data frame belongs to the non-preemptive traffic class, wherein a first fragment of the second data frame has completed transmission;
   transmit the first data frame over the data communications link after the transmission of the second data frame is preempted; and
   resume the transmission of the second data frame over the data communications link using at least one subsequent fragment of the second data frame, wherein
   the circuitry is configured to provide a first path including a first MAC sublayer to the MAC merge sublayer for traffic belonging to the preemptive traffic class and a second path, which is different from the first path, including a second MAC sublayer to the MAC merge sublayer for traffic belonging to the non-preemptive class.

2. The transmitter of claim 1, wherein the circuitry is further configured to preempt when at least a predetermined amount of data of the second data frame has been transmitted.

3. The transmitter of claim 1, wherein the circuitry is further configured to add a fragmentation header to the second data frame before the second data frame is transmitted in response to determining that the second data frame is preemptable.

4. The transmitter of claim 1, wherein the circuitry is further configured to append a fragment cyclic redundancy check (CRC) field to each one of the at least one subsequent fragment of the second data frame.

5. The transmitter of claim 1, wherein the circuitry is further configured to make a predetermined change to a cyclic redundancy check (CRC) value of a CRC field of the first fragment of the second data frame.

6. The transmitter of claim 5, wherein the predetermined change corresponds to an inversion of at least a portion of the CRC value.

7. The transmitter of claim 1, wherein the circuitry is further configured to append a fragmentation trailer to each data frame.

8. The transmitter of claim 7, wherein the fragmentation trailer includes a fragment cyclic redundancy check (CRC) field.

9. The transmitter of claim 7, wherein the fragmentation trailer includes a field that indicates whether the data frame is a last fragment in a sequence of frame fragments.

10. The transmitter of claim 7, wherein the fragmentation trailer includes a frame number field that is incremented for each data frame transmitted that is capable of fragmentation.

11. The transmitter of claim 7, wherein the fragmentation trailer includes a fragment number field that is incremented for each data frame in a sequence of frame fragments.

12. A method implemented in a transmitter configured to transmit data frames across a data communications link, the method comprising:
   determining whether a first data frame should preempt a second data frame that is currently being transmitted over the data communications link;
   preempting transmission of the second data frame in a media access control (MAC) sublayer or a MAC merge sublayer when the first data frame should preempt the second data frame, the preempting further comprising completing transmission of a first fragment of the second data frame;
   transmitting the first data frame over the data communications link after the transmission of the first fragment has completed; and
   resuming the transmission of the second data frame over the data communications link using at least one subsequent fragment of the second data frame, wherein a first path is provided that includes a first MAC sublayer to the MAC merge sublayer for traffic belonging to the preemptive traffic class and a second path is provided, which is different from the first path, that includes a second MAC sublayer to the MAC merge sublayer for traffic belonging to the non-preemptive class.

13. A non-transitory computer-readable medium including computer-program instructions, which when executed by an electronic device, cause the electronic device to:
   determine whether a first data frame should preempt a second data frame that is currently being transmitted over the data communications link;
   preempt transmission of the second data frame in a media access control (MAC) sublayer or a MAC merge sublayer when the first data frame should preempt the second data frame, the preempting further comprising completing transmission of a first fragment of the second data frame;
   transmit the first data frame over the data communications link after the transmission of the first fragment has completed; and
   resume the transmission of the second data frame over the data communications link using at least one subsequent fragment of the second data frame, wherein a first path is provided that includes a first MAC sublayer to the MAC merge sublayer for traffic belonging to the preemptive traffic class and a second path is provided, which is different from the first path, that includes a second MAC sublayer to the MAC merge sublayer for traffic belonging to the non-preemptive class.

14. The transmitter of claim 1, wherein the circuitry is configured to fragment the second data frame upon determining that it belongs to the non-preemptive class prior to determining whether to preempt transmission of the second data frame.

15. The transmitter of claim 1, wherein the circuitry is configured to fragment the second data frame only after it is determined to preempt transmission of the second data frame.

16. The transmitter of claim 7, wherein the fragmentation trailer is 32 bits in length.

17. The transmitter of claim 7, wherein the fragmentation trailer includes a last fragment indicator, a frame number field, a fragment number field, and a fragment cyclic redundancy check (CRC) field.

18. The transmitter of claim 11, wherein the fragment number field is 8 bits in length.

* * * * *